United States Patent
Edwards et al.

(10) Patent No.: US 12,196,125 B2
(45) Date of Patent: *Jan. 14, 2025

(54) STOICHIOMETRIC HIGH-TEMPERATURE DIRECT-INJECTION COMPRESSION-IGNITION ENGINE

(71) Applicant: The Board of Trustees of the Leland Stanford Junior University, Stanford, CA (US)

(72) Inventors: Christopher F. Edwards, Sunnyvale, CA (US); Bernard H. Johnson, IV, Stanford, CA (US); Gregory B. Roberts, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,760

(22) Filed: Dec. 7, 2022

(65) Prior Publication Data
US 2023/0358161 A1    Nov. 9, 2023

Related U.S. Application Data

(63) Continuation of application No. 16/017,333, filed on Jun. 25, 2018, now Pat. No. 11,542,856, which is a
(Continued)

(51) Int. Cl.
*F02B 3/08* (2006.01)
*F02D 13/02* (2006.01)
(Continued)

(52) U.S. Cl.
CPC ............ *F02B 3/08* (2013.01); *F02D 13/0203* (2013.01); *F02D 19/0647* (2013.01);
(Continued)

(58) Field of Classification Search
CPC .. F02B 3/08; F02B 2700/026; F02D 13/0203; F02D 19/0647; F02D 19/0655;
(Continued)

(56) References Cited

U.S. PATENT DOCUMENTS

2005/0126551 A1* 6/2005 Mello ..................... F02D 41/00
123/549
2011/0265770 A1* 11/2011 Malfa ..................... F02M 26/00
123/184.21
(Continued)

FOREIGN PATENT DOCUMENTS

JP          59152031 A    *   8/1984
JP          01080756 A    *   3/1989
JP       2018009530 A    *   1/2018    ................ F02B 1/12

*Primary Examiner* — Ngoc T Nguyen
(74) *Attorney, Agent, or Firm* — LUMEN PATENT FIRM

(57) ABSTRACT

A neat-fuel direct-injected compression ignition engine having a thermal barrier coated combustion chamber, an injection port injects fuel that satisfies a stoichiometric condition with respect to the intake air, a mechanical exhaust regenerator transfers energy from exhaust gas to intake compression stages, an exhaust $O_2$ sensor inputs to a feedback control to deliver quantified fuel, a variable valve actuation (VVA) controls valve positions, an exhaust gas temperature sensor controls exhaust feedback by closing the exhaust valve early according to the VVA, or recirculated to the chamber with an exhaust-gas-recirculation (EGR), heat exchanger, and flow path connecting an air intake, a load command input, and a computer operates the EGR from sensors to input exhaust gas according exhaust temperature signals and changes VVA timing, the load control is by chamber exhaust gas, the computer operates a fuel injector to deliver fuel independent of exhaust gas by the $O_2$ signals.

28 Claims, 7 Drawing Sheets

Related U.S. Application Data continuation of application No. 15/870,414, filed on Jan. 12, 2018, now abandoned, which is a continuation of application No. 14/679,882, filed on Apr. 6, 2015, now Pat. No. 9,903,262.

(60) Provisional application No. 61/976,052, filed on Apr. 7, 2014.

(51) Int. Cl.
| | |
|---|---|
| *F02D 19/06* | (2006.01) |
| *F02D 41/00* | (2006.01) |
| *F02D 41/14* | (2006.01) |
| *F02B 23/06* | (2006.01) |
| *F02M 26/05* | (2016.01) |
| *F02M 26/23* | (2016.01) |

(52) U.S. Cl.
CPC ..... *F02D 19/0655* (2013.01); *F02D 41/0025* (2013.01); *F02D 41/0062* (2013.01); *F02D 41/1446* (2013.01); *F02D 41/1454* (2013.01); *F02B 2023/0612* (2013.01); *F02B 23/0669* (2013.01); *F02B 23/0672* (2013.01); *F02B 2700/023* (2013.01); *F02B 2700/026* (2013.01); *F02B 2720/20* (2013.01); *F02B 2720/257* (2013.01); *F02D 2041/001* (2013.01); *F02D 2250/32* (2013.01); *F02M 26/05* (2016.02); *F02M 26/23* (2016.02); *Y02T 10/12* (2013.01); *Y02T 10/30* (2013.01); *Y02T 10/40* (2013.01)

(58) Field of Classification Search
CPC .......... F02D 41/0025; F02D 41/14454; F02D 41/1446; F02M 26/22; F02M 26/05; F02M 26/16; F02F 3/10; F02F 1/004; F02F 2001/008

See application file for complete search history.

(56) References Cited

U.S. PATENT DOCUMENTS

| | | | |
|---|---|---|---|
| 2015/0240758 A1* | 8/2015 | Fujimoto | ............... F02M 25/12 123/3 |
| 2017/0022924 A1* | 1/2017 | Fujimoto | ........... F02M 25/0222 |

* cited by examiner

STOICHIOMETRIC HIGH-TEMPERATURE DIRECT-INJECTION COMPRESSION-IGNITION ENGINE

CROSS-REFERENCE TO RELATED APPLICATIONS

This application is a continuation of U.S. patent application Ser. No. 16/017,333 filed Jun. 25, 2018, which is incorporated herein by reference. U.S. patent application Ser. No. 16/017,333 is a continuation of U.S. patent application Ser. No. 15/870,414 filed Jan. 12, 2018, which is incorporated herein by reference. U.S. patent application Ser. No. 15/870,414 filed Jan. 12, 2018 is a continuation of U.S. patent application Ser. No. 14/679,882 filed Apr. 6, 2015, which is incorporated herein by reference. U.S. patent application Ser. No. 14/679,882 filed Apr. 6, 2015, claims priority from US Provisional Patent Application 61/976,052 filed Apr. 7, 2014, which is incorporated herein by reference.

FIELD OF THE INVENTION

The present invention relates generally to combustion engines. More particularly, the invention relates a combustion engine capable of using a range of non-traditional fuels such as neat alcohols (e.g. methanol and ethanol), natural gas, or dimethyl ether in direct-injection, compression-ignited, high-temperature engines.

BACKGROUND OF THE INVENTION

Neat alcohols as alternative fuels for Diesel engines have been under investigation for several decades. In one attempt, commercial engine development was addressed in the early 1980's with the production of a methanol-fueled, compression-ignited (CI) engine. The combination of low cetane number and large enthalpy of vaporization was addressed by retaining hot combustion products within the cylinder to create sufficient ignition conditions near top dead center (TDC) with a relatively high compression ratio, up to 23:1. The engine operated in a direct-injection, two-stroke fashion, and the amount of exhaust gas removed during the scavenging process was controlled for stable combustion. Glow plugs were used for cold-start operation only. Particulate measurements from the engine were non-negligible, and this was attributed in large part to burned engine oil since the particulate matter (PM) emissions did not increase with fuel to air ratio.

In another attempt, testing was conducted with a single-cylinder, four-stroke engine operating on neat methanol, as well as wet methanol and methanol blended with higher alcohols. In order to achieve consistent autoignition, a compression ratio of 18.9:1 with intake air preheating to 138° C. was required, which was interpreted as the simulation of turbocharging without intercooling. The reported smoke data is very low across the load range tested, which remained below stoichiometric conditions.

A low heat rejection (LHR) engine has been used to investigate emissions and performance for direct-injection, spark-assisted combustion of methanol and ethanol as compared to Diesel fuel. In this study, a single-cylinder engine with a compression ratio of 16.5:1 was outfit with an insulated piston face and head. The measurements of Bosch smoke number were reported being essentially zero for both alcohols, as compared to the Diesel-fuel baseline. The apparent heat release rate data indicated that the increase in compressed air temperature due to LHR surfaces allowed combustion to occur in two phases: that initiated by the spark plug, and that attributed to autoignition.

Ethanol has been researched in a partially premixed combustion (PPC) approach. Here, a significant amount of fuel-air mixing is desired before combustion, although a separate late injection is used for phasing control. The tested equivalence ratios approached, but did not meet, stoichiometric conditions. Peak temperatures were limited by the overall lean combustion and the use of exhaust gas recirculation (EGR) for nitrogen oxides (NOx) avoidance. Measurements from the PPC split injection strategy show low soot emissions, as expected from the large amount of pre-mixing. In this attempt, intake boosting and intake air preheating were required for ignition.

The inherent nature of low soot emissions from oxygenated fuels was previously analyzed in detail. It was shown experimentally that if the oxygen mass fraction of a fuel is greater than 30%, the measured smoke number is nearly zero. This may be achieved through the use of either neat or blended fuels. From this perspective, it is clear that both methanol (50% oxygen mass fraction) and ethanol (35% oxygen mass fraction) are attractive choices, and are expected to emit low levels of soot. Similarly, dimethyl ether (DME) has the same atomic composition as ethanol and is also expected to form little soot.

The intermolecular bonding of DME is different than ethanol, with the oxygen atom located between two methyl groups. As a result, its properties are different. Most notably, it has a Diesel-fuel-like cetane rating, in the range of 55-60. Its early use in Diesel engines was investigated as an ignition improver for DI methanol in a compression ignition engine. The DME was admitted into the intake air, and the direct injection of methanol was sufficiently ignited. It was believed that the lean DME-air mixture combusted during the compression stroke, thus raising the ambient gas temperature to a level that was acceptable for methanol ignition delay. As a neat DI fuel, DME has been tested and shown to enable clean and efficient operation of a Diesel engine. It is noteworthy that DME requires storage at several bar above atmospheric pressure in order to remain a liquid.

The use of neat alcohols, namely methanol and ethanol, in direct-injection, compression-ignited engines is difficult, most notably due to their poor ignitability. What is needed is a high temperature combustion strategy that enables the used of oxygenated and inherently low-sooting fuels for heavy-load applications.

SUMMARY OF THE INVENTION

To address the needs in the art, a neat-fuel direct-injected compression ignition engine is provided that includes an engine combustion chamber having a thermal barrier coating on the engine combustion chamber surfaces that include piston, valves, and head surfaces, a direct injection port disposed to inject a neat fuel quantity that satisfies a stoichiometric condition with respect to an intake air quantity to the engine combustion chamber, a mechanical exhaust regenerator having turbine expansion stages disposed to transfer energy from an exhaust gas stage to an intake compression stage, an exhaust gas $O_2$ sensor having data input to an active feedback control disposed to deliver quantified fuel amounts, a variable valve actuation (VVA) system that controls a position of an intake valve and a position of an exhaust valve, an exhaust gas temperature sensor disposed to provide active feedback control of exhaust gas that is regulated by closing the exhaust valve early with respect to piston position according to the VVA system, or where the exhaust gas is recirculated external to the combustion cylinder with an exhaust gas recirculation (EGR) system that includes a mass flow controller, heat exchanger, and flow path, where the flow path connects to an air intake of the engine combustion chamber, a load command input according to a position of a gas pedal, and an appropriately programmed computer that receives measurement signals from the exhaust temperature sensor and the exhaust $O_2$ sensor and operates an exhaust-gas-recirculation system to input the exhaust gas to the engine combustion chamber according to the measurement signals from the exhaust temperature sensor and changes an opening timing and a closing timing of the VVA system according to the measurement signals from the exhaust temperature sensor, where the engine load control is implemented by a quantity of the exhaust gas within the engine combustion chamber, where the computer operates a fuel injector to deliver the stoichiometric amount of neat fuel with respect to the amount of intake air that is independent of the quantity of the exhaust gas present within the combustion chamber according to the measurement signals from the exhaust $O_2$ sensor.

According to one aspect of the invention, the thermal barrier coating includes yttria-stabilized zirconia, or steel alloy, or INCONEL® nickel-chromium-based superalloy.

In a further aspect of the invention, the neat-fuel includes ethanol, natural gas, methanol, or di-methyl ether.

According to another aspect of the invention, the mechanical exhaust regenerator further includes a turbo charger, a super charger, or a turbo-compound.

In one embodiment, a method of operating neat-fuel direct-injected compression ignition engine at a stoichiometric condition is provided that includes coating engine combustion chamber surfaces with a thermal barrier coating, where the engine combustion chamber surfaces includes a piston surface, valve surfaces, and head surface, injecting a neat fuel to the combustion chamber using a direct injection port, where the neat fuel includes a neat fuel quantity that satisfies a stoichiometric condition with respect to an intake air quantity to the engine combustion chamber, using a mechanical exhaust regenerator to transfer energy from an exhaust gas stage to an intake compression stage, where the mechanical exhaust regenerator includes turbine expansion stages, using an exhaust gas $O_2$ sensor to input $O_2$ sensor data to an active feedback control, where the active feedback control is disposed to deliver quantified fuel amounts; using a variable valve actuation (VVA) system to control a position of an intake valve and a position of an exhaust valve, using an exhaust gas temperature sensor to provide active feedback control of exhaust gas, where the exhaust gas is regulated by closing the exhaust valve early with respect to piston position according to the VVA system, or where the exhaust gas is recirculated external to the combustion cylinder with an exhaust gas recirculation (EGR) system, where the EGR system includes a mass flow controller, heat exchanger, and flow path, where the flow path connects to an air intake of the engine combustion chamber, using a load command input, where the load command input is according to a position of a gas pedal, and using an appropriately programmed computer to receive measurement signals from the exhaust temperature sensor and the exhaust $O_2$ sensor, where the appropriately programmed computer operates an exhaust-gas-recirculation system to input the exhaust gas to the engine combustion chamber according to the measurement signals from the exhaust temperature sensor, where the appropriately programmed computer changes an opening timing and a closing timing of the VVA system according to the measurement signals from the exhaust temperature sensor, where the engine load control is implemented by a quantity of the exhaust gas within the engine combustion chamber, where the appropriately programmed computer operates a fuel injector to deliver the stoichiometric amount of neat fuel with respect to the amount of intake air that is independent of the quantity of the exhaust gas present within the combustion chamber according to the measurement signals from the exhaust $O_2$ sensor.

DETAILED DESCRIPTION

The current invention is a stoichiometric, fuel-agnostic, direct-injection, compression-ignition engine for replacement of traditional Diesel engines in long-range, heavy-duty transportation. The engine according to the current invention includes numerous changes in architecture from a traditional Diesel engine. The current invention enables the use of low Cetane alternative fuels (e.g. methanol or ethanol) as well as high Cetane alternative fuels (e.g. dimethyl ether) to be directly injected with high fuel loadings up to stoichiometric conditions.

The current invention creates a suitable combustion environment for fuels that are resistant to auto-ignition. Ignition studies have been previously performed on methanol and ethanol and demonstrate a need for ~1100 K TDC engine temperatures for ignition. Higher temperatures are needed to allow for a wider range of combustion timings. According to one embodiment of the invention, modeling shows that these temperatures are achieved through the use of thermal barrier coatings on selected engine components, and with turbo-charging to elevate charge temperatures.

There are multiple embodiments that create a suitable combustion environment. According to one embodiment, turbocharging is implemented, where it is staged to permit even higher loads. In another embodiment, intercooling or aftercooling is used to improve efficiency. In a further embodiment, removing these components allows for even higher temperatures to aid in complete combustion. In the event the exhaust still carries sufficient energy, turbocompounding is used to improve efficiency and load.

Figure 1A:
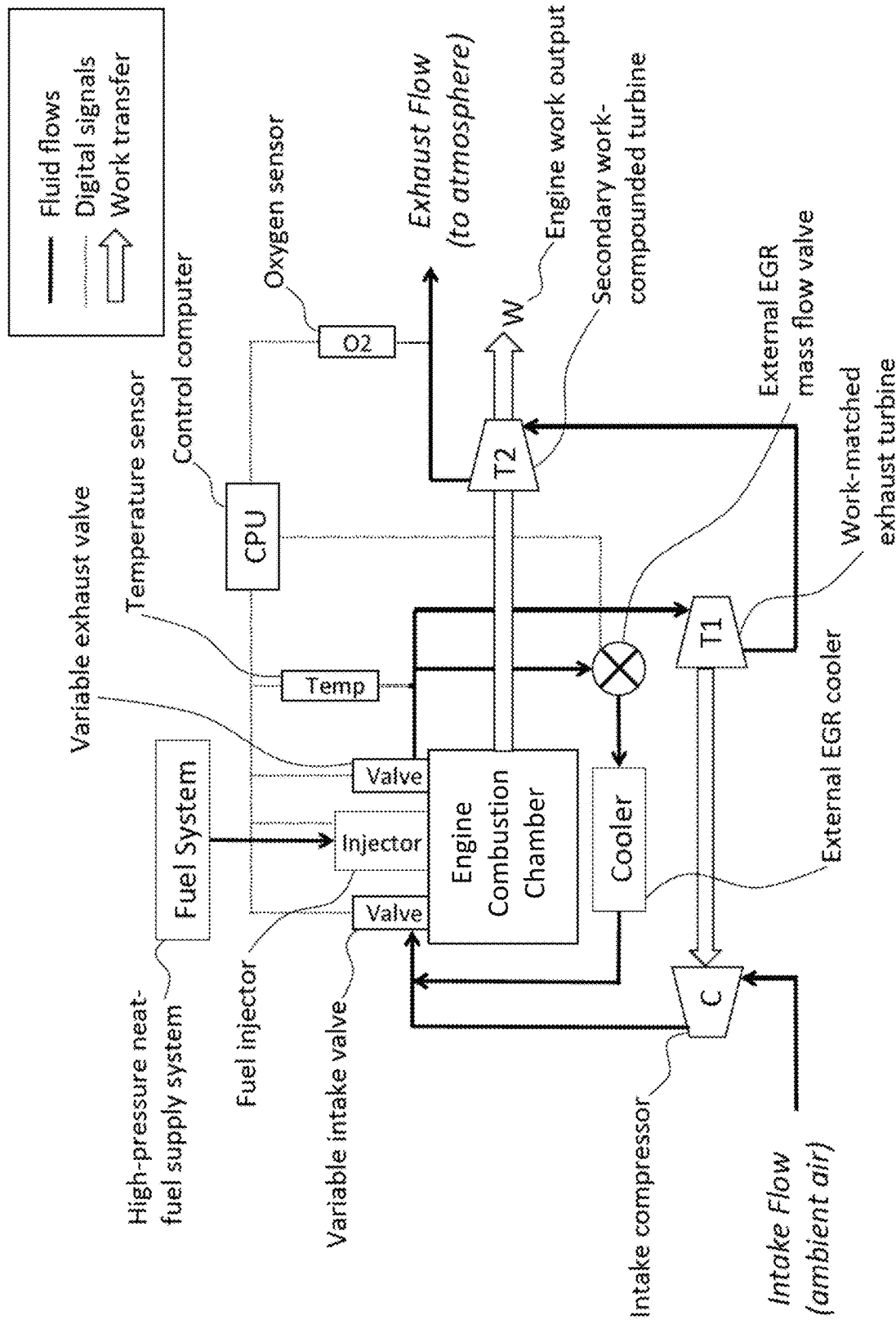
FIGS. 1A-1B show component architecture (FIG. 1A) and the location of insulation shown in gray (FIG. 1B) for an engine that would allow for stoichiometric, direct-injection operation, according to one embodiment of the invention.
Figure 1B:
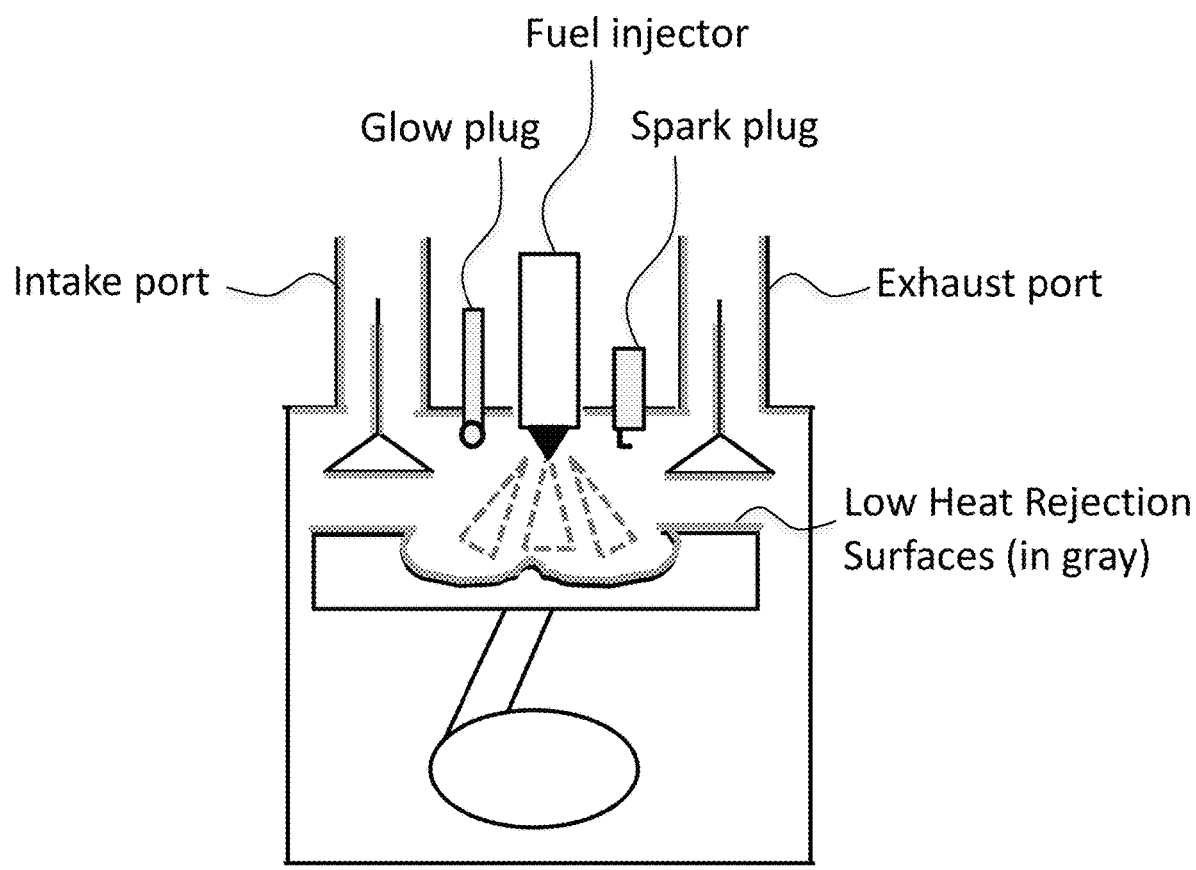

In other embodiments, thermal insulation is achieved through a variety of techniques. Ceramic coatings like 8 YSZ are coated onto surfaces, steel alloy or INCONEL® nickel-chromium-based superalloy caps with thermal gaps are installed on the surfaces. According to the current invention, only the piston, ports, valves, and head are insulated. The liner remains untreated and conventionally cooled to permit the use of normal lubricants. An exemplary example for this engine is shown in FIG. 1A and FIG. 1B. As shown in FIG. 1A, a neat-fuel direct-injected compression ignition engine is provided that includes an engine combustion chamber having a thermal barrier coating on the engine combustion chamber surfaces (see FIG. 1B) that include piston, valve, and head surfaces. A direct injection port is disposed to inject a neat fuel quantity that satisfies a stoichiometric condition with respect to an intake air quantity to the combustion chamber. Further, a mechanical exhaust regenerator, for example a workmatched exhaust turbine, having turbine expansion stages is disposed to transfer energy from an exhaust gas stage to an intake compression stage. An exhaust gas O2 sensor having data input to an active feedback control is disposed to deliver quantified fuel amounts. Additionally, a variable valve actuation (VVA) system that controls a position of an intake valve and a position of an exhaust valve, an exhaust gas temperature sensor is disposed to provide active feedback control of exhaust gas that is regulated by closing the exhaust valve early with respect to an ignition timing according to the VVA system, or where the exhaust gas is recirculated external to the combustion cylinder with an exhaust gas recirculation (EGR) system that includes a mass flow controller, heat exchanger, and flow path, where the flow path connects to an air intake of the engine combustion chamber. A load command input operates according to a position of a gas pedal. Finally, an appropriately programmed computer receives measurement signals from the exhaust temperature sensor and the exhaust $O_2$ sensor, and operates an exhaust-gas-recirculation system to input the exhaust gas to the engine combustion chamber according to the measurement signals from the exhaust temperature sensor, and changes an opening timing and a closing timing of the VVA system according to the measurement signals from the exhaust temperature sensor, where the engine load control is implemented by a quantity of the exhaust gas within the engine combustion chamber, where the computer operates a fuel injector to deliver the stoichiometric amount of neat fuel with respect to the amount of intake air that is independent of the quantity of the exhaust gas present within the combustion chamber according to the measurement signals from the exhaust $O_2$ sensor.

Figure 2A:
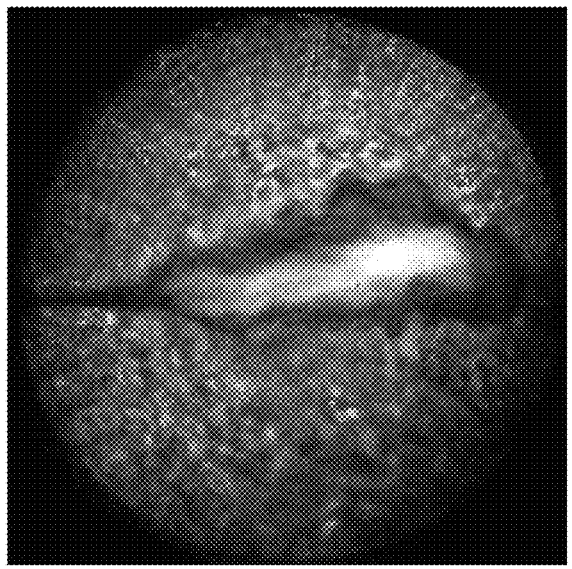
FIGS. 2A-2D show liquid methanol (FIG. 2A) and gaseous methane (FIG. 2B) reacting jets within 1200 K ambient air, (FIG. 2C) and (FIG. 2D) show images of these two fuel jets in similar air environments with an ambient air temperature of ~1200 K and pressure of ~180 bar, according to one embodiment of the invention.
Figure 2B:
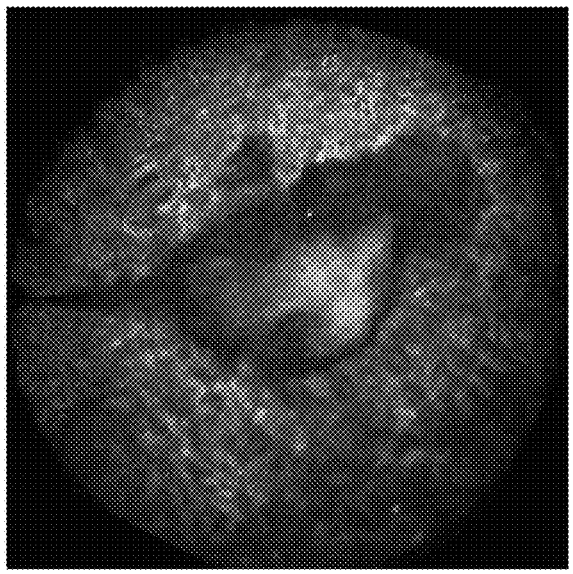

In addition to the use of alcohol fuels described below, the high temperature combustion environment also allows for the use of natural gas as a direct-injection fuel. This is significant since many trucks are already being retrofitted to carry either liquefied natural gas (in cryogenic tanks) or compressed natural gas (in high-pressure tanks). Imaging has been done on methane (the primary component of natural gas) injections, which demonstrates similar combustion characteristics to the alcohol fuels, including the production of very low levels of soot. The images in FIG. 2A and FIG. 2B show a comparison between a combusting jet of liquid methanol as compared to gaseous methane.

Discussed below are particulate emissions for an engine operating on methanol, the result of which is extremely low levels (approximately 1 order of magnitude below the governmental regulation limit) even up to stoichiometric conditions. The methane image in FIG. 2B indicates that even lower levels of soot are produced within a combusting jet, and hence very low levels of particulate emissions are expected as well for an engine operating on stoichiometric amounts of methane.

Figure 3:
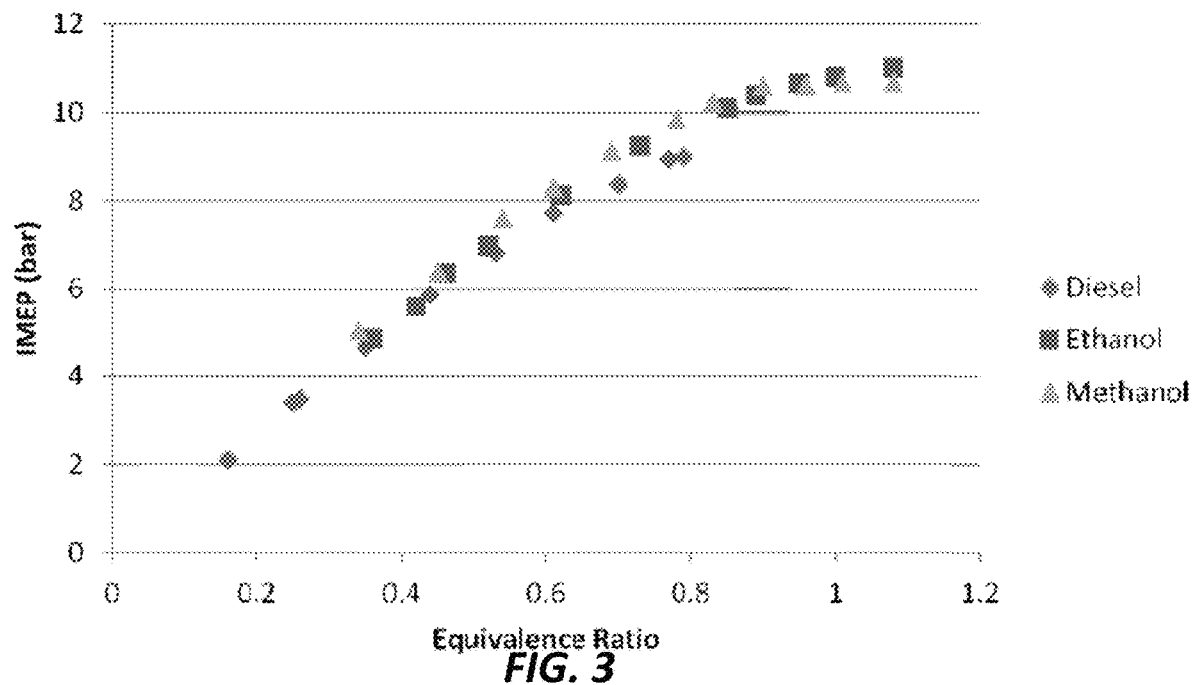
FIG. 3 shows a research engine load output versus equivalence ratio for Diesel no. 2 fuel compared to methanol and ethanol, according to one embodiment of the invention.

Some of the benefits of developing an engine that operates under the conditions of high temperature with alternative fuels are described herein. One main benefit is emissions; the engine has low soot emissions (obviating the need for a particulate filter), and operates at stoichiometric conditions (allowing the use of a cheap three-way catalyst to control gas-phase emissions (namely CO, unburned hydrocarbons, and NOx), instead of an expensive NOx reduction system). There are further benefits that include operating with defined stoichiometric fuel loadings, which allows for a much higher power output from the engine. This is especially significant since many engines are being replaced by fumigated, natural gas engines, which must be larger than normal Diesel engines to compensate for their lower power output. FIG. 3 shows experimentally measured power output from a single-cylinder research engine, indicating an increase through stoichiometric operation, thereby enabling 30% more power and torque.

In addition to the use of thermal insulation and turbocharging to enable high temperature operation, the current invention includes the use of variable valve timing to control load, according to one embodiment. Exhaust gas is retained to dilute the fresh charge entering the engine, while keeping temperatures elevated to ensure ignition criteria are met for the alternative fuels as well as nearly-complete combustion. At a low enough load, retained hot residual enables dilute combustion strategies (e.g. HCCI) that permit load reduction down to idle, as described further below. Using variable valve timing and HCCI to vary direct-injected load from full to idle while maintaining stoichiometric proportions is a key aspect of the current invention.

Turning now to the experimental data, provided herein is data from a single-cylinder research engine that shows particulate matter (PM) emissions for Diesel-style combustion of both methanol and ethanol that are below the current US Government regulation limit.

In this exemplary experiment, the level of particulates remained low up to stoichiometric ratios of fuel and air. A complete emissions analysis indicates a high combustion efficiency of ~96% at stoichiometric conditions.

In order to achieve reliable combustion in the research engine, some form of intake air preheating is required. The issue of ignitability is addressed with modeling, which indicates that highly turbocharged, non-intercooled air into a cylinder with low heat rejection (LHR) surfaces can achieve conditions that satisfy acceptable ignition delay requirements. With increased exhaust enthalpy, thermal or mechanical exhaust regeneration embodiments are enabled, according to the current invention. All of these features contribute to a clean, high-efficiency Diesel engine with heavy-load capability.

To explore the nature of soot formation within alcohol spray jets, images are provided from another single-cylinder device with optical access. The images show single-plume combustion for both methanol and ethanol into an air environment similar to that of an engine. Broadband luminosity is observable for both fuels within the interior of each jet. This indicates that a balance exists between soot formation and oxidation, the difference of which is responsible for engine-out emissions.

A major difficulty in using either neat methanol or ethanol in a Diesel engine is their low cetane numbers (~1-10) compared to traditional Diesel fuel (~45). For typical conditions at TDC, the compressed air temperature is insufficient to achieve ignitability requirements for either alcohol.

Measurements of ignition delay for sprays of ethanol and methanol into Diesel-like conditions in a constant-volume combustion vessel have been made for methanol and ethanol. The pressure delay is defined as the time required for an increase of 0.25 atm above the pressure that would have been measured had no injection occurred. If a delay of 2 ms is defined as the minimum threshold for what is acceptable within a Diesel engine, a start-of-injection (SOI) in-cylinder temperature of about 1100 K is required for both alcohols.

The requirement for 1100 K air at SOI is addressed with a thermodynamic, crank-angle resolved engine simulation, according to the current invention. The model includes ideal gas properties with heat capacity as a function of temperature, a heat transfer model to account for energy transfer between the working fluid and the engine surfaces, as well as a two-zone combustion model. Five different configurations were analyzed in detail for an engine with a geometric compression ratio of 17:1: (1) a naturally aspirated conventional CI configuration, (2) a LHR engine with thermal barrier coated surfaces on the head, piston face, valves and ports, (3) a turbocharged metal-surfaced engine with intercooling, (4) a turbocharged LHR engine with intercooling, and (5) a non-intercooled turbocharged engine with LHR surfaces. The peak air temperatures achieved by each model are shown in the following Table 1. These values are computed by allowing the simulated surface temperatures to reach steady-state, which are influenced by combustion. Then an additional cycle is simulated with the combustion submodel inactivated. The corresponding peak temperatures of this last cycle are listed in Table 1.

TABLE 1

Peak TDC air temperatures achievable for engine configurations with a geometric CR of 17:1.

| Engine Model Configuration | Peak Air Temperature (K) |
| --- | --- |
| Naturally aspirated, metal surfaces | 1077 |
| Naturally aspirated, LHR surfaces | 1131 |
| Intercooled turbocharger (2.5 bar intake manifold pressure), metal surfaces | 1146 |
| Intercooled turbocharger (2.5 bar), LHR surfaces | 1215 |
| Non-intercooled turbocharger (2.5 bar), LHR surfaces | 1295 |

The conventional engine configuration never reaches the 1100 K temperature necessary for alcohol ignition, while the addition of LHR surfaces only reaches the temperature threshold for such a small period of time that phasing combustion would be difficult. This demonstrates that turbocharging, in addition to LHR surfaces, will be necessary to achieve acceptable pre-injection temperatures over a wide range of injection timings. Note that although intercooling makes a small improvement to the load and efficiency of an engine, it lowers peak temperatures and thus limits the possible injection timings.

According to an exemplary experimental set up, two separate single-cylinder devices are employed for taking images and making emissions measurements. One device has optical access and uses a free-piston architecture, making its operation single-shot with only one fuel injection event occurring near TDC. The other is a continuously reciprocating engine with simulated boost capability.

Images were obtained with a Phantom high-speed digital camera fitted with a Nikon 50 mm lens. The frame interval was set to 27 μs, and the exposure time was varied. An argon-ion laser was used for illumination of the cylinder bore via the sapphire end-wall. A Schlieren imaging technique was employed in order to clearly visualize the internal air motion, fuel injection, and plume dilatation upon ignition.

The images were taken at TDC for compression ratios in the range of 41:1 to 45:1. The resultant measured TDC pressures were 163 to 180 bar and, assuming isentropic compression, temperatures of 1165 to 1190 K. This air temperature is representative of the condition created within the continuously reciprocating engine discussed next, although the pressure is higher. This is because the free-piston compression began from atmospheric conditions, and the single-cylinder engine used intake air preheating with a smaller geometric compression ratio.

Figure 4:
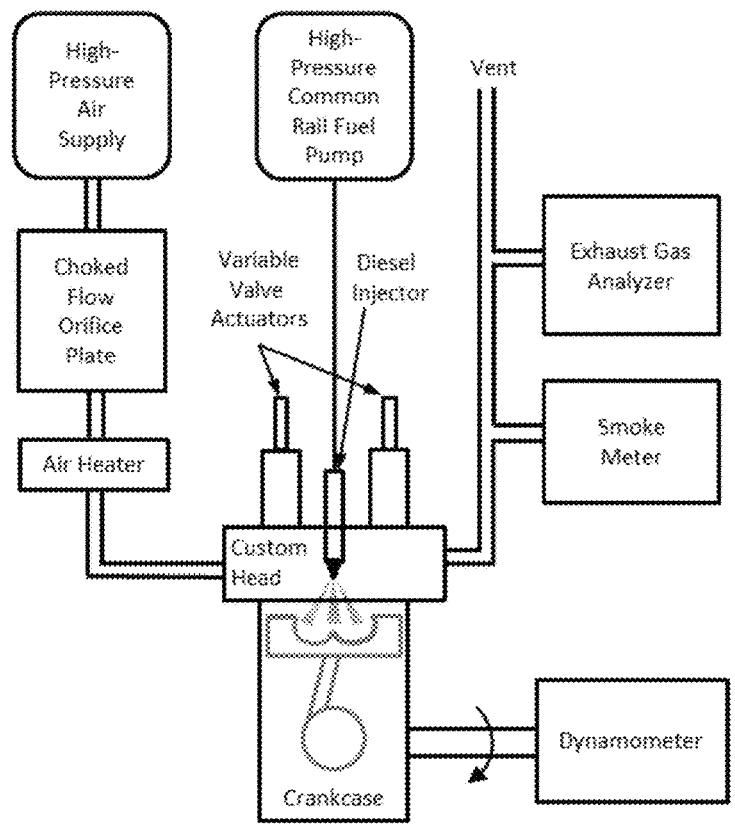
FIG. 4 shows a schematic for an single-cylinder, direct-injection compression ignition research engine, according to one embodiment of the invention.

A single-cylinder engine built on a Waukesha crankcase was used to measure the engine-out particulate and gaseous emissions of direct-injected, alcohol combustion. A schematic for the engine system is shown in FIG. 4. The engine has a movable head to vary the compression ratio, and hydraulically actuated valves for fully variable valve timing. For this experiment, the compression ratio was fixed at 16.8:1 and the engine was operated at 1800 RPM. A bowl-in-piston geometry was used to facilitate direct-injection operation. Dry air was supplied by a high-pressure system through an orifice plate to measure flow rate, and was set at 100% volumetric efficiency regardless of intake temperature. Due to a relatively small valve area, the intake port was significantly above atmospheric pressure, while the exhaust system pressure was atmospheric. Gaseous emissions ($H_2$, CO, $CO_2$, $O_2$, NOx and UHCs) were measured with a gas analyzer unit. Combustion efficiency was calculated as:

$$\eta_{combustion} = 1 - LHV_{products}/LHV_{reactants} \quad (1)$$

where LHV is the lower heating value as computed from the gas composition. Unburned hydrocarbons (UHCs) were assumed to be unburnt fuel molecules, which provides a lower bound on combustion efficiency since the UHC measurement includes small hydrocarbon fuel fragments. Response factors for the flame ionization detector were determined separately for methanol and ethanol with values of 0.7 and 0.8, respectively.

Particulate emissions were measured with a Bosch smoke meter. In order to convert the measured smoke number to a particulate concentration, the meter used a correlation developed for use with conventional Diesel fuel. Since neat alcohol fuels were used without a lubricity improver, it was assumed that the measured particulate matter was comprised of primarily combustion-generated soot. It is possible, however, that burned engine oil may have contributed to the PM emissions as well.

Fuel was pressurized with a Bosch Diesel pump, and injected through a Bosch piezo-actuated injector taken from a Volkswagen Jetta. The fuel pump performed well for all fuels. It could not deliver as high a pressure when operating on the alcohol fuels, but it could easily maintain an adequate pressure. Fuel injection timing was set to maximize work output, and because injection duration could only be adjusted in single crank-angle degree increments by the controller, fuel pressure was kept relatively low, at 10,000 psi, to ensure a wide range in load (i.e. a low rail pressure allows smaller fuel mass injection quantization thus achieving lower equivalence ratios). This lower pressure is expected to negatively impact fuel-air mixing and atomization, and as a result might serve to increase soot formation.

In order to allow for alcohol operation, the intake air was preheated prior to induction. For these experiments, the inlet heater temp was fixed at 125° C. for both alcohol fuels. The heater was significantly upstream of the intake port, so some cooling was expected between the heater and the cylinder.

Once firing, the heater temperature could be lowered without altering the ignition delay or phasing as residual gas temperatures and surface temperatures both increased. Despite this, the heater temperature was held fixed to ensure consistency across all operating points. Additional specifications for this exemplary engine are shown in Table 2.

TABLE 2

Engine operating specifications

| Bore | 3.81" |
|---|---|
| Stroke | 3.62" |
| Speed | 1800 RPM |
| Volumetric Efficiency | 100% |
| Injection Timing | MBT |
| Geometric CR | 16.8:1 |
| Injection Pressure | 10,000 psi |
| Heater Temperature | 125° C. |

Although 125° C. represents significant intake heating, the aforementioned modeling indicates that it is not unreasonable for heavy-duty operation. Similar pre-injection temperatures could be achieved with turbocharger boosting, no intercooling, and additional charge heating due to elevated engine surface temperatures implemented to reduce heat transfer.

Figure 2C:
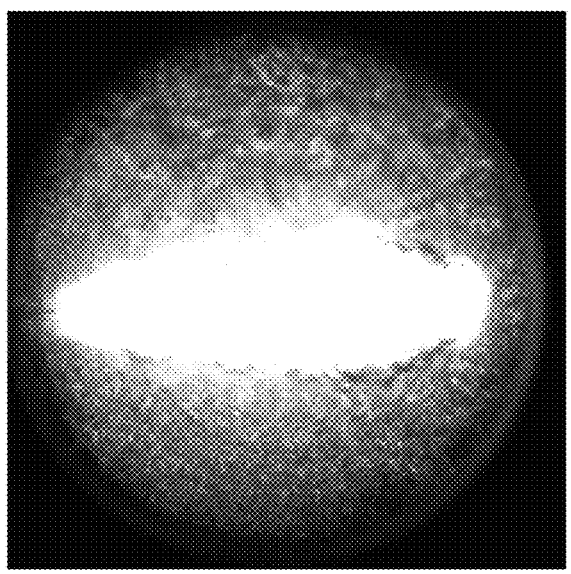
Figure 2D:
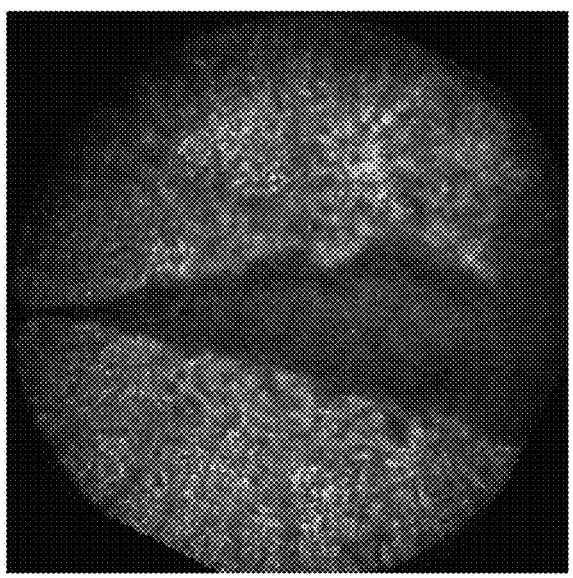

Turning now to experimental results for spray images of Diesel and Methanol. The high-compression cylinder with optical access was used to observe the combustion behavior of an injection of Diesel no. 2 as compared to neat methanol. FIG. 2C and FIG. 2D show images of these two fuel jets in similar air environments with an ambient air temperature of ~1200 K and pressure of ~180 bar. The start of injection was ~1 ms before each image was taken, and the jets had reached a quasi-steady-state behavior.

Both images were captured with an exposure time of 3 µs. It is clear that the Diesel jet was producing significant amounts of soot, as evidenced by the large region of broadband radiation from within the jet. The methanol image, in comparison, shows no soot particle radiation. From the series of images that were collected for the methanol injection, a distinct plume dilatation event was observable, indicative of ignition. Additionally, the rise in the photodiode signal correlated well with the observed plume dilatation. (The overall equivalence ratio was very lean for these single injections, and thus the measured cylinder pressure was not significantly influenced by the combustion event.)

Figure 6A:
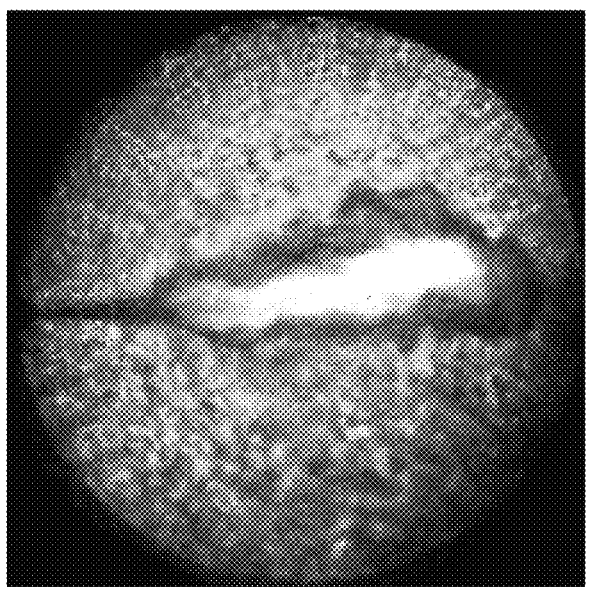
FIGS. 6A-6B show fuel spray of methanol (FIG. 6A) and ethanol (FIG. 6B) with image exposure time is 26 µs, according to one embodiment of the invention.
Figure 6B:
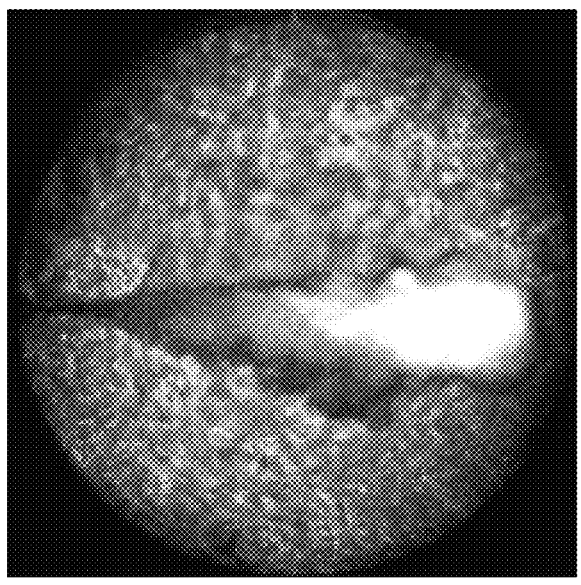

It is postulated that the single-hole injections shown in FIG. 6A and FIG. 6B are representative of each of the 7 that exist on the injector nozzle used in the DI engine operated for emissions analysis. If jet-wall and jet-jet interactions are neglected, then the overall cylinder-out particulate emissions are a function of the net formation-oxidation balance that occurs within each jet and during late-stage mixing.

Regarding the particulate emissions for Diesel and Methanol, the single-cylinder engine from FIG. 4 was operated with Diesel no. 2 and methanol fuels. The intake air heater was only used for testing with methanol. The load was varied with equivalence ratios that range from 0.3 to 0.8. Above this value, the soot formation from the Diesel fuel affected operability as combustion efficiency decreased and cylinder carbon deposits increased. The particulate matter emission measurements are shown in FIG. 5.

These measurements demonstrate the necessity of exhaust filtration for conventional Diesel engines. Although additional measures could be taken that would affect the quantity of PM emissions, such as using EGR, higher injection pressures or inducing swirl, the values in the high-load range are two orders of magnitude greater than the current regulation limit of 0.01 g/hp-hr.

Furthermore, because the stoichiometry is lean, the NOx emissions would have to be handled with a separate reduction method. Typically this is done with ammonia- or urea-based selective catalytic reduction (SCR). Although the data is not shown, NOx emission measurements were taken for both fuels, and each recorded levels of several hundred ppm. Thus, additional treatment would be necessary for both Diesel and methanol fuels.

Figure 5:
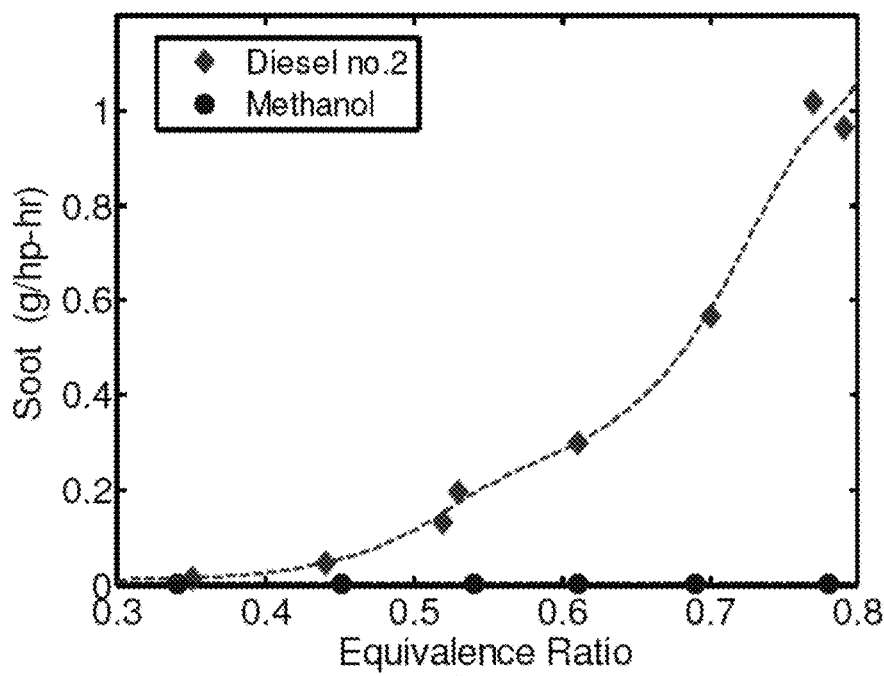
FIG. 5 shows particulate matter emission measurements for Diesel and methanol fuels, according to one embodiment of the invention.

With regards to PM, the methanol data in FIG. 5 shows low levels of emissions measured for all equivalence ratios. The comparison with ethanol is shown next, and the methanol data from FIG. 5 are compared to ethanol on a scale that shows the actual values measured.

For additional experimental results of spray images, FIG. 6A and FIG. 6B show results of ethanol and methanol injections. The image exposure time was increased to 26 µs, nearly a factor of nine greater than the images from FIG. 2A and FIG. 2B. The argon laser light intensity was adjusted accordingly to account for the longer exposure time. As in FIG. 2A and FIG. 2B, the ambient gas temperature is ~1200 K and ~180 bar. The start of injection was again ~1 ms before the image was taken, and both jets had reached quasi-steady-state.

It is apparent that both fuels exhibit broadband radiation from soot particles. The methanol spray in FIG. 2A may be directly compared to the methanol spray in FIG. 6A, where the primary difference is image exposure time. The brightest regions exist in the head of the jet for both fuels. The color of radiation, however, differs between the two. The orange wavelengths in the methanol image indicate a lower temperature than the whiter regions within the ethanol image. The temperature difference is most likely attributed to the variation in enthalpy of vaporization between the two alcohols, where methanol has a value that is ~26% greater than that of ethanol, by mass.

Figure 7:
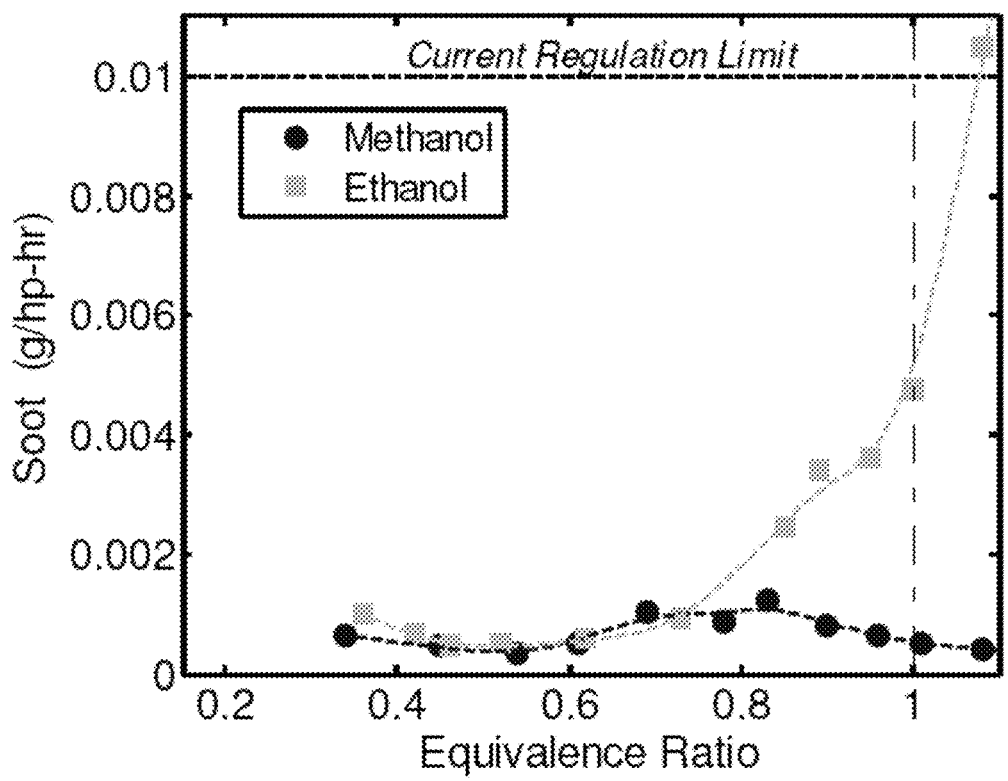
FIG. 7 shows particulate emission measurements, for methanol and ethanol, from the single-cylinder engine, according to one embodiment of the invention.

Particulate emission measurements, for methanol and ethanol, from the single-cylinder engine are shown in FIG. 7. Soot formation from using either alcohol fuel did not affect engine operability and thus higher equivalence ratios could be tested. These PM measurements indicate that as the equivalence ratio increases to stoichiometric, the soot formation-oxidation balance remains nearly even for methanol, and for ethanol it is slightly in favor of formation.

It is noted, however, that emissions remain below the limit of 0.01 g/hp-hr up to stoichiometric operation for both fuels. This indicates that soot mass emissions are not a limiting factor for alcohol-fueled Diesel engine operation, and that a particulate filter may not be necessary for the exhaust system. Because stoichiometric combustion of both alcohol fuels are not limited by PM emissions, this introduces the possibility of treating NOx (in addition to CO and UHCs) with a three-way catalyst, a significantly cheaper alternative to an SCR (or lean NOx trap) system.

Figure 8:
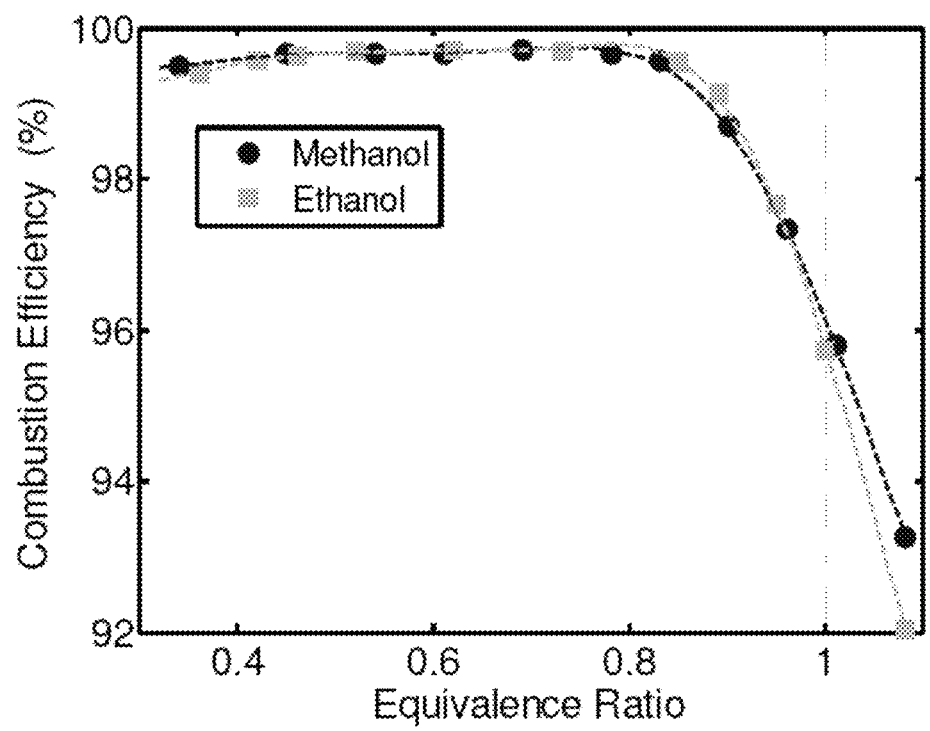
FIG. 8 shows the measured combustion efficiency for both alcohols, as a function of equivalence ratio, according to one embodiment of the invention.

If stoichiometric operation with either methanol or ethanol is not limited by PM emissions, it is important to consider the impact of combustion efficiency. FIG. 8 shows the measured combustion efficiency for both alcohols, as a function of equivalence ratio.

Figure 9:
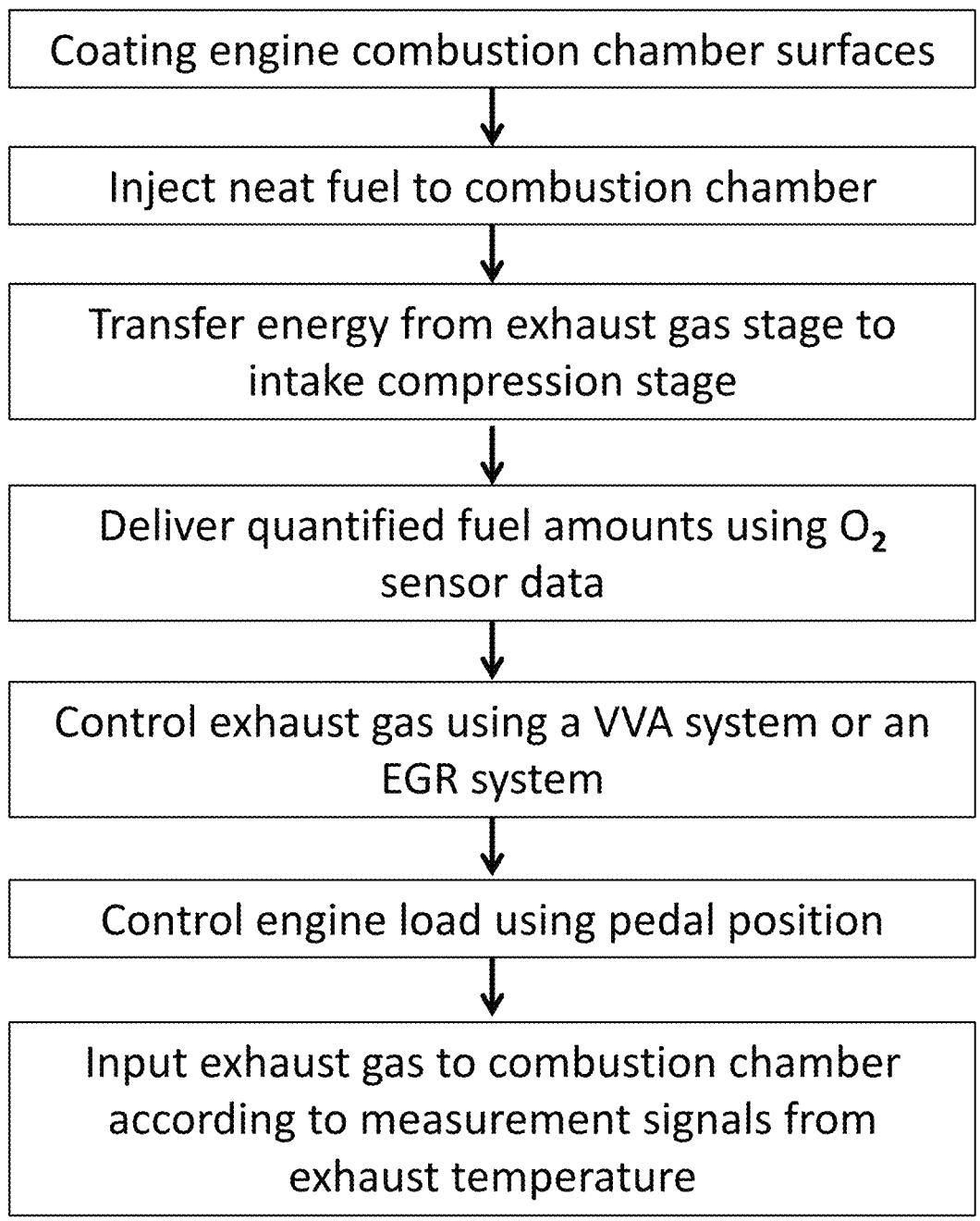
FIG. 9 shows a flow diagram of a method of operating a combustion chamber with a stoichiometric amount of neat fuel, according to one embodiment of the invention.

FIG. 9 shows a flow diagram of a method of operating neat-fuel direct-injected compression ignition engine at a stoichiometric condition that includes coating engine combustion chamber surfaces with a thermal barrier coating, where the engine combustion chamber surfaces includes a piston surface, valve surfaces, and head surface, injecting a neat fuel to the combustion chamber using a direct injection port, where the neat fuel includes a neat fuel quantity that satisfies a stoichiometric condition with respect to an intake air quantity to the engine combustion chamber, using a mechanical exhaust regenerator to transfer energy from an exhaust gas stage to an intake compression stage, where the mechanical exhaust regenerator includes turbine expansion stages, using an exhaust gas $O_2$ sensor to input $O_2$ sensor data to an active feedback control, where the active feedback control is disposed to deliver quantified fuel amounts; using a variable valve actuation (VVA) system to control a position of an intake valve and a position of an exhaust valve, using an exhaust gas temperature sensor to provide active feedback control of exhaust gas, where the exhaust gas is regulated by closing the exhaust valve early with respect to piston position according to the VVA system, or where the exhaust gas is recirculated external to the combustion cylinder with an exhaust gas recirculation (EGR) system, where the EGR system includes a mass flow controller, heat exchanger, and flow path, where the flow path connects to an air intake of the engine combustion chamber, using a load command input, where the load command input is according to a position of a gas pedal, and using an appropriately programmed computer to receive measurement signals from the exhaust temperature sensor and the exhaust $O_2$ sensor, where the appropriately programmed computer operates an exhaust-gas-recirculation system to input the exhaust gas to the engine combustion chamber according to the measurement signals from the exhaust temperature sensor, where the appropriately programmed computer changes an opening timing and a closing timing of the VVA system according to the measurement signals from the exhaust temperature sensor, where the engine load control is implemented by a quantity of the exhaust gas within the engine combustion chamber, where the appropriately programmed computer operates a fuel injector to deliver the stoichiometric amount of neat fuel with respect to the amount of intake air that is independent of the quantity of the exhaust gas present within the combustion chamber according to the measurement signals from the exhaust $O_2$ sensor.

Although it is significant that alcohol fuels have minimal particulate emissions even at stoichiometric conditions, it is also important to ensure combustion efficiency remains reasonably high at those operating points, where it is difficult for all of the fuel to find the oxygen necessary to combust completely. While a three-way catalyst enabled by stoichiometric operation can eliminate incomplete combustion products as an emissions issue, if combustion efficiency becomes too low it can affect overall engine efficiency. For both alcohol fuels, combustion efficiency dips to around 96% at stoichiometric. While this is enough to reduce thermal efficiency, the negative impact is largely mitigated in engines with high amounts of mechanical exhaust regeneration since the fuel energy can be recovered in the exhaust system after a catalytic burner. Thus, achieving 96% combustion efficiency in a highly-regenerated, low-sooting, stoichiometric engine could be acceptable to realize high thermal efficiencies.

The current invention provides neat alcohol, direct-injected, compression ignition architectures for well-phased, stoichiometric combustion at high effective compression ratios. While this presents an opportunity to design a low emission CI engine, it also enables a pathway to high thermal efficiency engines. High compression ratios and stoichiometric combustion reduce combustion irreversibility and improve expansion work. Meanwhile, ceramic thermal barrier coatings (TBC) on engine surfaces improve efficiency by reducing heat transfer losses. When combined with mechanical exhaust regeneration, such as turbo compounding, thermal efficiencies can exceed 50%. A schematic for a modeled engine implementing these features, which has a 51% LHV efficiency, is shown in FIG. 1A and FIG. 1B.

As mentioned previously, highly regenerated engines not only have high efficiency, but also reduce the penalty for poor combustion efficiency. A catalytic burner placed immediately before (or after) the turbocharger could combust the remaining unburnt fuel, and the energy can be recovered in the exhaust system by the expansion turbine. Although this is not as ideal as performing complete combustion in-cylinder, it is substantially better than not utilizing the remaining fuel energy.

High power densities are achievable by implementing a stoichiometric fuel-air ratio (enabling exhaust emissions treatment with a three-way catalyst) with no amount of dilution. This load capability is contrasted with low temperature combustion (LTC) strategies that typically rely on high levels of EGR dilution to suppress peak combustion temperatures in order to avoid significant NOx and soot formation, resulting in less-than-maximal engine work output.

The previous analysis demonstrates the potential of a stoichiometric, alcohol-fueled Diesel engine at high load, but that is only one requirement when exploring a new engine concept. While peak efficiency at high-load is important, it is also critical to ensure that the engine can operate over a wide load range. In the present case, this means an alcohol Diesel engine must also be able to operate in low-load and mid-load regimes, while still maintaining stoichiometric operation, high efficiency, and acceptable combustion characteristics.

Throttling to decrease load is inefficient, so managing load by dilution is preferable. In order to enable the use of a three-way catalyst, the exhaust composition must have a stoichiometric fuel-air ratio, which means that any dilution must be achieved with exhaust gas.

While an external EGR loop could deliver the necessary dilution, the exhaust temperature will be high, making heat loss an issue. One embodiment of the invention mixes exhaust with the fresh charge by closing the exhaust valve early (and retaining exhaust), or closing it late (and re-inducting exhaust).

In another exemplary embodiment, exhaust retention was modeled to obtain a preliminary estimate for the prospects of load variation. Two different valve timings were explored. The first had moderate exhaust retention and lowered load to 16.0 bar BMEP (58% of full load). The second had high levels of exhaust retention, which lowered load to 9 bar BMEP (32% of full load). Increasing dilution lowers LHV-based efficiency to 47% and 43% respectively, but this may be an acceptable level, where the high temperature residual ensures that ignition temperatures remain high enough for alcohol fuels. These results are shown in Table 3.

TABLE 3

Engine load variation

| Load (BMEP) | LHV Efficiency | Peak Pre-Injection Temperature (K) |
|---|---|---|
| 27.7 bar (100% load) | 51% | 1339 |
| 16.0 bar (58% load) | 47.4% | 1509 |
| 8.9 bar (32% load) | 43.3% | 1628 |

The prospect for high-temperature combustion of neat alcohol fuels in direct-injection, compression-ignited engines has been investigated. The application is specific to the heavy-load transportation industry, where expensive aftertreatment could be avoided by operating at stoichiometric conditions, thus opening the opportunity to use a three-way catalyst for all other gas-phase emissions.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, if compression of the intake air from the turbo- or super-charger is insufficient for reaching the necessary temperature to satisfy autoignition criteria of the injected fuel, it may be possible to implement a heat exchange device that transfers thermal energy from the exhaust gas to the intake air.

All such variations are considered to be within the scope and spirit of the present invention as defined by the following claims and their legal equivalents.

What is claimed:

1. A direct-injected compression ignition engine system, comprising:
   (a) a combustion chamber having a direct injection port configured to deliver fuel, an intake port configured to receive intake air and an exhaust port configured to allow exhaust gas to exit the combustion chamber;
   (b) a thermal barrier coating disposed on a surface of the combustion chamber, the thermal barrier coating configured to retain heat within the combustion chamber; and
   (c) a fuel injector configured to deliver a stoichiometric ratio of a fuel to an amount of intake air.

2. The direct-injected compression ignition engine system of claim 1, wherein a particulate matter emission level remains below 0.01 g/hp-hr during operation of the direct-injected compression ignition engine system.

3. The direct-injected compression ignition engine system of claim 1, further comprising: an exhaust gas recirculation system fluidically coupled to the exhaust port and the intake port, the exhaust gas recirculation system configured to transfer a portion of the exhaust gas to the combustion chamber via the intake port.

4. The direct-injected compression ignition engine system of claim 3, wherein the exhaust gas recirculation system includes a heat exchanger configured to cool the portion of the exhaust gas being transferred to the combustion chamber.

5. The compression ignition engine system of claim 3, wherein the exhaust gas recirculation system includes an exhaust gas recirculation valve configured to control the portion of the exhaust gas being transferred to the combustion chamber.

6. The compression ignition engine system of claim 3, wherein the exhaust gas recirculation system includes an exhaust $O_2$ sensor configured to measure an $O_2$ level of the exhaust gas.

7. The compression ignition engine system of claim 3, wherein the exhaust gas recirculation system includes an exhaust temperature sensor configured to measure an exhaust gas temperature.

8. The direct-injected compression ignition engine system of claim 3, further comprising: a variable valve actuation device configured to retain exhaust within the combustion chamber in order to further dilute air entering the engine via the intake port.

9. The direct-injected compression ignition engine system of claim 1, further comprising: an exhaust regenerator fluidically coupled to the exhaust port, the exhaust regenerator configured to transfer energy from the exhaust gas to an intake air compressor.

10. The direct-injected compression ignition engine system of claim 1, wherein the thermal barrier coating includes at least one of ceramics, zirconia, yttria-stabilized zirconia, steel alloys, nickel-chromium-based alloys, and austenitic nickel-chromium-based super alloys.

11. The direct-injected compression ignition engine system of claim 1, wherein the fuel includes at least one of ethanol, natural gas, methanol, and di-methyl ether.

12. The direct-injected compression ignition engine system of claim 1, wherein a level of nitrogen oxides emissions in the exhaust gas is maintained below an emissions limit by controlling the stoichiometric ratio and without the use of selective catalytic reduction.

13. The direct-injected compression ignition engine system of claim 1, further comprising: an exhaust regenerator fluidically coupled to the exhaust port, the exhaust regenerator configured to transfer energy from the exhaust gas to an engine work output.

14. The direct-injected compression ignition engine system of claim 13, wherein the engine work output includes work from a turbo-compound engine.

15. The direct-injected compression ignition engine system of claim 1, further comprising: a supercharger, a turbo charger, or a combination thereof.

16. A direct-injected compression ignition engine system, comprising:
   (a) a combustion chamber having a direct injection port, an intake port configured to receive intake air, and an exhaust port configured to allow exhaust gas to exit the combustion chamber;
   (b) a thermal barrier coating disposed on a surface of the combustion chamber, the thermal barrier coating configured to retain heat within the combustion chamber; and
   (c) a fuel injector configured to deliver to the combustion chamber via the direct injection port a stoichiometric ratio of the fuel to an amount of intake air, wherein a level of nitrogen oxides emissions in the exhaust gas is maintained below an emissions limit by controlling the stoichiometric ratio and without the use of selective catalytic reduction.

17. The direct-injected compression ignition engine system of claim 16, further comprising an exhaust regenerator fluidically coupled to the exhaust port, the exhaust regenerator configured to transfer energy from the exhaust gas to an intake air compressor.

18. The direct-injected compression ignition engine of claim 16, wherein the exhaust regenerator includes a supercharger, a turbo charger, or a combination thereof.

19. A direct-injected compression ignition engine system, comprising:
   (a) a combustion chamber having a direct injection port, an intake port configured to receive intake air, and an exhaust port configured to allow exhaust gas to exit the combustion chamber;
   (b) a thermal barrier coating disposed on a surface of the combustion chamber, the thermal barrier coating configured to retain heat within the combustion chamber;
   (c) a fuel injector configured to deliver to the combustion chamber via the direct injection port a stoichiometric ratio of a fuel to an amount of intake air; and
   (d) an exhaust gas recirculation system fluidically coupled to the exhaust port and the intake port, the exhaust gas recirculation system configured to transfer a portion of the exhaust gas to the combustion chamber via the intake port.

20. The direct-injected compression ignition engine system of claim 19, wherein a level of nitrogen oxides emissions in the exhaust gas is maintained below an emissions limit by controlling the stoichiometric ratio and without the use of selective catalytic reduction.

21. The direct-injected compression ignition engine system of claim 19, further comprising: an exhaust regenerator fluidically coupled to the exhaust port, the exhaust regenerator configured to transfer energy from the exhaust gas to an intake air compressor.

22. The direct-injected compression ignition engine system of claim 19, further comprising: an exhaust regenerator fluidically coupled to the exhaust port, the exhaust regenerator configured to transfer energy from the exhaust gas to an engine work output.

23. The direct-injected compression ignition engine system of claim 22, wherein the engine work output includes work from a turbo-compound engine.

24. The compression ignition engine system of claim 19, wherein the exhaust gas recirculation system includes an exhaust gas recirculation valve configured to control the portion of the exhaust gas being transferred to the combustion chamber.

25. The direct-injected compression ignition engine of claim 9, wherein the exhaust regenerator includes a supercharger, a turbo charger, or a combination thereof.

26. The direct-injected compression ignition engine of claim 13, wherein the exhaust regenerator includes a supercharger, a turbo charger, or a combination thereof.

27. The direct-injected compression ignition engine of claim 21, wherein the exhaust regenerator includes a supercharger, a turbo charger, or a combination thereof.

28. The direct-injected compression ignition engine of claim 22, wherein the exhaust regenerator includes a supercharger, a turbo charger, or a combination thereof.

* * * * *